Patented June 16, 1942

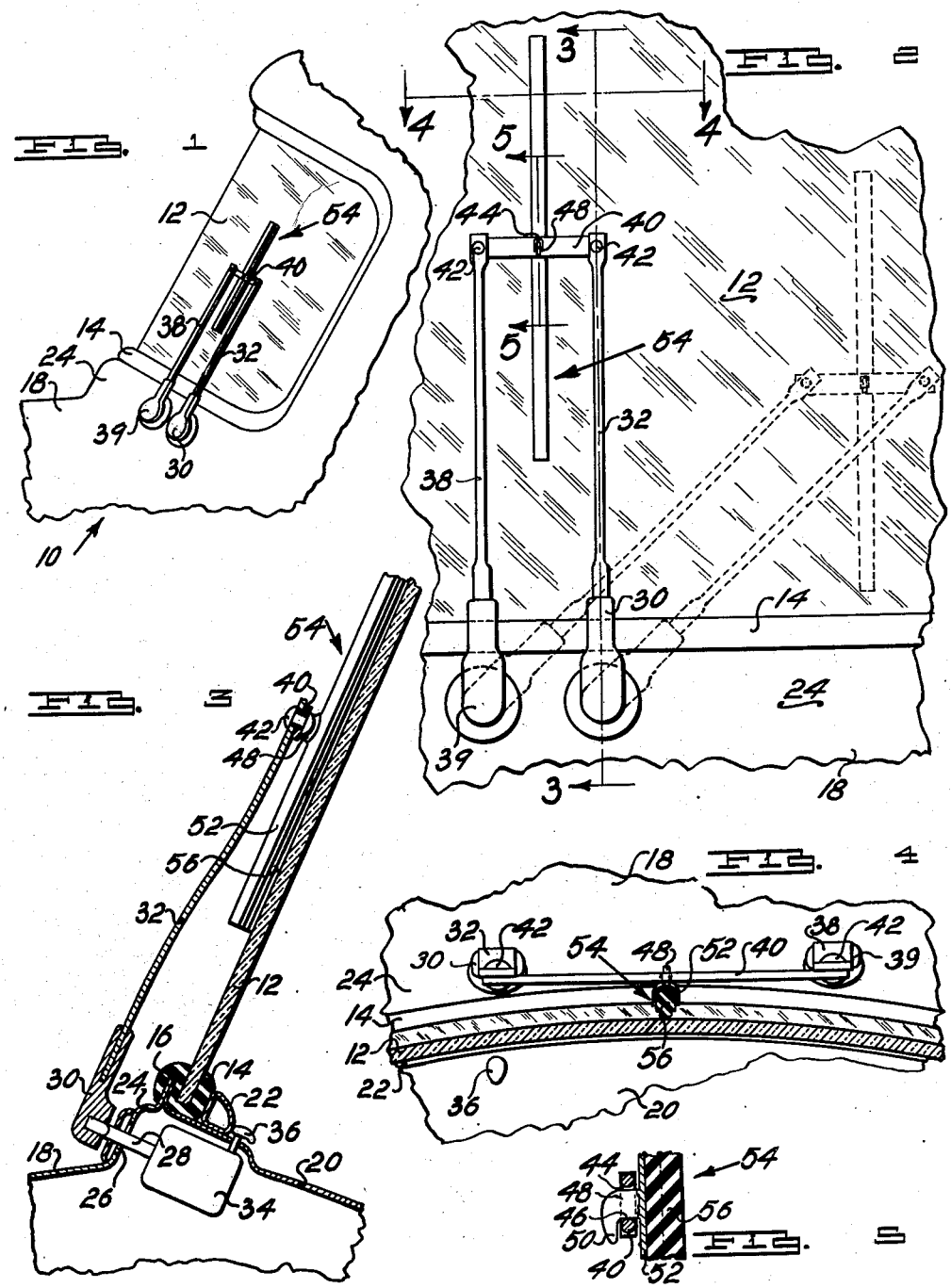

2,286,449

UNITED STATES PATENT OFFICE 2,286,449

WINDSHIELD WIPER

Nils Erik Wahlberg, Kenosha, Wis., assignor to Nash-Kelvinator Corporation, Kenosha, Wis., a corporation of Maryland Application November 18, 1940, Serial No. 366,073

1 Claim. (Cl. 15—253)

This invention relates to windshield wipers and has particular reference to windshield wipers arranged to operate on windshields having a curved surface.

It is an object of this invention to provide a windshield wiper which will swing a wiper blade through an arc while keeping the blade at all times parallel to the surface of a curved windshield.

It is another object of this invention to provide a simple linkage which will maintain a wiper blade parallel to, and in contact with, the surface of a curved windshield.

Other objects and advantages of this invention will be apparent from a consideration of the following description and claim and the attached drawings, of which there is one sheet, and in which—

Figure 1 represents a side elevation of an automotive windshield;

Figure 2 represents a front elevation of an automotive windshield;

Figure 3 represents a section taken along a plane indicated by the line 3—3 in Figure 2 and looking in the direction of the arrows;

Figure 4 represents a section taken along a plane indicated by the line 4—4 in Figure 2 and looking in the direction of the arrows; and Figure 5 represents a section taken along a plane indicated by the line 5—5 in Figure 2 and looking in the direction of the arrows.

The invention is disclosed as being applied to an automobile having a curved front windshield; however, the wiper structure may equally well be employed on any vehicle having a curved window. The wiper is also effective on flat windshields.

The drawing which discloses the preferred form of the invention illustrates an automobile 10 having a windshield 12 which is mounted in the automobile by means of a gasket 14. The windshield 12 is curved along a cylindrical surface, the axis of which is sloped backwardly from the front of the automobile. It is not essential that the windshield be curved along a circular cylindrical surface so long as the surface is one which may be defined by a series of parallel elements.

As is more particularly shown in Figure 3, the gasket 14 which is positioned around the edge of the windshield is provided with a groove which fits over a flange 16 formed by joining the rear edge of the cowl panel 18 and the forward edge of the instrument panel 20. The gasket 14 is further retained in place by a molding strip 22 and the cowl panel 18 is provided with a raised portion 24 which is apertured as at 26 to pass the shaft 28 on which the base 30 of the wiper arm 32 is secured. The shaft 28 extends from any suitable type of wiper motor 34 which is controlled by a switch 36 positioned on top of the instrument panel 20.

The linkage of the wiper structure consists of a driven arm 32 and an idler arm 38 which is attached to a base 39 pivoted on an idler shaft (not shown). The free ends of the arms 32 and 38 are joined by a tie bar 40 which is supported on the arms by the pivot pins 42. The length of the tie bar between the pins 42 is approximately equal to the distance between the driven shaft 28 and the idler shaft, and the lengths of the arms 32 and 38 between the shafts and the pins 42 are equal.

The tie bar 40 is provided with a transverse slot 44, the upper and lower edges of which are rounded as at 46. The slot 44 receives an ear 48 which is provided with a hooked end 50 and which may rock on the rounded edges of the slot. The ear 48 is attached to, or forms a part of, the base 52 of a wiper blade generally indicated at 54. A rubber or other flexible wiping strip 56 is secured in the base 52.

The arms 32 and 38 are made of spring material and are initially deflected on installation on the automobile so as to constantly urge the tie bar 40 towards the windshield 12. The arms 32 and 38 and the tie bar 40 form a parallelogram so that in all operating positions of the driven arm 32, the tie bar 40 and wiper blade 54 will maintain the same angular relationship with respect to the axis of the windshield 12 and the elements of the surface of the windshield.

It is desirable to mount the driven shaft 28 and the idler shaft in a plane perpendicular to the axis of the windshield and equidistant from and parallel to a radius of the cylindrical surface of the windshield. In this position of the shafts, the tie bar 40 will at all times lie in a plane perpendicular to the axis of the windshield and the blade 54 will be mounted perpendicular to the tie bar 40 and at all times parallel to the elements of the cylindrical surface of the windshield. However, the shafts may be mounted in other positions with respect to the windshield, the only limitation being that the projection of the arms 32 and 38 and the tie bar 40 on the plane in which the bases 30 and 39 rotate shall form a parallelogram and that the wiper blade 54 be mounted on the tie bar 40 in a position parallel to the elements of the surface of the windshield. The blade 54 shall be free to pivot on the main axis of the bar 40 in a plane parallel to the axis of the windshield but should be restrained against rotation in any plane passed through the tie bar. Other methods of spring pressing the arms and wiper blade toward the windshield may also be employed without departing from the theory of the invention.

In operation, the motor 34 will oscillate the driven arm 32 while the idler arm and tie bar maintain the wiper blade parallel to the elements of the cylindrical surface of the windshield. The spring characteristics of the arms keep the blade in contact with the windshield.

While I have described my invention in some detail, I intend this description to be an example only and not as a limitation of my invention, to which I make the following claim:

In combination with a windshield having a curved surface made up of straight parallel elements; a pair of arms pivoted to oscillate in a plane parallel to a second plane tangent to said surface, a tie bar pivoted to the outer ends of said arms, said bar defining a slot having its major axis parallel to the elements of the surface of said windshield, said arms being arranged to urge said bar toward said second plane, and a wiper blade supported by said tie bar, said blade having an ear positioned in said slot and arranged to maintain said blade and tie bar in perpendicular relationship.

NILS ERIK WAHLBERG.